United States Patent
Lee et al.

(10) Patent No.: US 8,687,005 B2
(45) Date of Patent: Apr. 1, 2014

(54) APPARATUS AND METHOD FOR SYNCHRONIZING AND SHARING VIRTUAL CHARACTER

(75) Inventors: Eun-Jung Lee, Suwon-si (KR); KiranPal Sagoo, Seongnam-si (KR); In-Sik Myung, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 12/128,202

(22) Filed: May 28, 2008

(65) Prior Publication Data
US 2009/0002377 A1    Jan. 1, 2009

(30) Foreign Application Priority Data

Jun. 26, 2007 (KR) .................. 10-2007-0063118

(51) Int. Cl.
*G06T 13/00* (2011.01)

(52) U.S. Cl.
USPC .......................... 345/473; 345/420; 345/474

(58) Field of Classification Search
USPC ................... 345/473; 84/645; 463/7
See application file for complete search history.

(56) References Cited

U.S. PATENT DOCUMENTS

| | | | | |
|---|---|---|---|---|
| 6,512,520 B1 * | 1/2003 | Naka et al. | | 345/473 |
| 7,315,820 B1 * | 1/2008 | Munns | | 704/260 |
| 2003/0206170 A1 * | 11/2003 | Bickmore et al. | | 345/473 |
| 2006/0109274 A1 * | 5/2006 | Alvarez et al. | | 345/473 |
| 2006/0180007 A1 * | 8/2006 | McClinsey | | 84/645 |
| 2007/0155494 A1 * | 7/2007 | Wells et al. | | 463/35 |
| 2007/0292106 A1 * | 12/2007 | Finkelstein et al. | | 386/55 |
| 2008/0094400 A1 * | 4/2008 | Yang et al. | | 345/473 |
| 2008/0113698 A1 * | 5/2008 | Egozy | | 463/7 |
| 2008/0294721 A1 * | 11/2008 | Berndt et al. | | 709/204 |
| 2008/0314228 A1 * | 12/2008 | Dreyfuss et al. | | 84/477 R |

FOREIGN PATENT DOCUMENTS

| | | |
|---|---|---|
| JP | 2005-165438 A | 6/2005 |
| JP | 2006-196017 A | 7/2006 |
| KR | 10-2006-0054678 A | 5/2006 |
| KR | 10-2007-0008238 A | 1/2007 |
| KR | 10-067620 B1 | 2/2007 |
| KR | 10-2007-0025834 A | 3/2007 |

OTHER PUBLICATIONS

Communication dated Sep. 30, 2013, issued by the Korean Intellectual Property Office in counterpart Korean Application No. 10-2007-0063118.

* cited by examiner

*Primary Examiner* — Phi Hoang
(74) *Attorney, Agent, or Firm* — Sughrue Mion, PLLC (57) ABSTRACT

An apparatus and method for synchronizing and sharing a virtual character are provided. The method includes generating a virtual character, synchronizing content in a predetermined form with the generated virtual character; converting the virtual character into an extensible markup language (XML)-based file and storing the XML-based file.

23 Claims, 5 Drawing Sheets

```
<?xml version="1.0" encoding="UTF-8"?>
<aal>
    <avatar ver = "1.0"/>                                              ~410
    <song_title> "Avatar" </song_title>                                ~420
    <file_format> mp3 </file_format>                                   ~430
    <animation>
        <time_scale selection = "Point" from = "45" to = "45" >        ~440
            <song feature = " Tempo" value = "20" >                    ~450
                <avatar_body part = "head" >                           ~460
                    rotate 360
                </avatar_body>
            </song>
        </time_scale>

<time_scale selection = "Range" from = "20" to = "30" >        ~470
            <song feature = " Loudness" >
                <avatar_body part = "Right Shoulder" >
                    up
                </avatar_body>
            </song>
        </time_scale>
    </animation>
</aal>
```

FIG. 5

APPARATUS AND METHOD FOR SYNCHRONIZING AND SHARING VIRTUAL CHARACTER

This application claims priority from Korean Patent Application No. 10-2007-0063118 filed on Jun. 26, 2007 in the Korean Intellectual Property Office, the disclosure of which is incorporated herein by reference in its entirety.

BACKGROUND OF THE INVENTION

1. Field of the Invention

Methods and apparatuses consistent with the present invention relate to an apparatus and method for synchronizing and sharing a virtual character, and more particularly, to an apparatus and method which enable a user to generate a virtual character by synchronizing received content in a predetermined form, converting the virtual character into an extensible markup language (XML)-based file, and storing and sharing the XML-based file.

2. Description of the Related Art

Methods currently exist which allow various body parts of virtual characters to move in various directions. However, technology which allows the body parts of the virtual characters to move synchronously with music is not currently available. Accordingly, a method of synchronizing the body part of the virtual character with a music file is required.

In addition, a method which enables a user to synchronize a virtual character with a music file and a method which enables the user to share the virtual character with another user and enables the other user to generate a new virtual character are required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method which enable a user to set motions of a character and synchronize each body part of the character with a music file.

The present invention also provides an apparatus and method which enable a user to adjust extracted metadata corresponding to a music file and synchronize the metadata with a body part of a character.

The present invention also provides an apparatus and method which enable a user to convert a virtual character, in which a character is synchronized with a music file, into an extensible markup language (XML)-based file and share the XML file with another user and which enable the other user to generate a new virtual character and share the new virtual character with another user.

However, the objectives of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided an apparatus for synchronizing and sharing a virtual character. The apparatus includes a transmission and reception module receiving content; and a virtual character generation module combining the content and generating a virtual character.

According to another aspect of the present invention, there is provided a method of synchronizing and sharing a virtual character. The method includes combining content in a predetermined form and generating a virtual character; and converting the virtual character into an XML-based file and storing the XML-based file.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Hereinafter, exemplary embodiments of the present invention will be described in detail with reference to the accompanying drawings.

Figure 1:
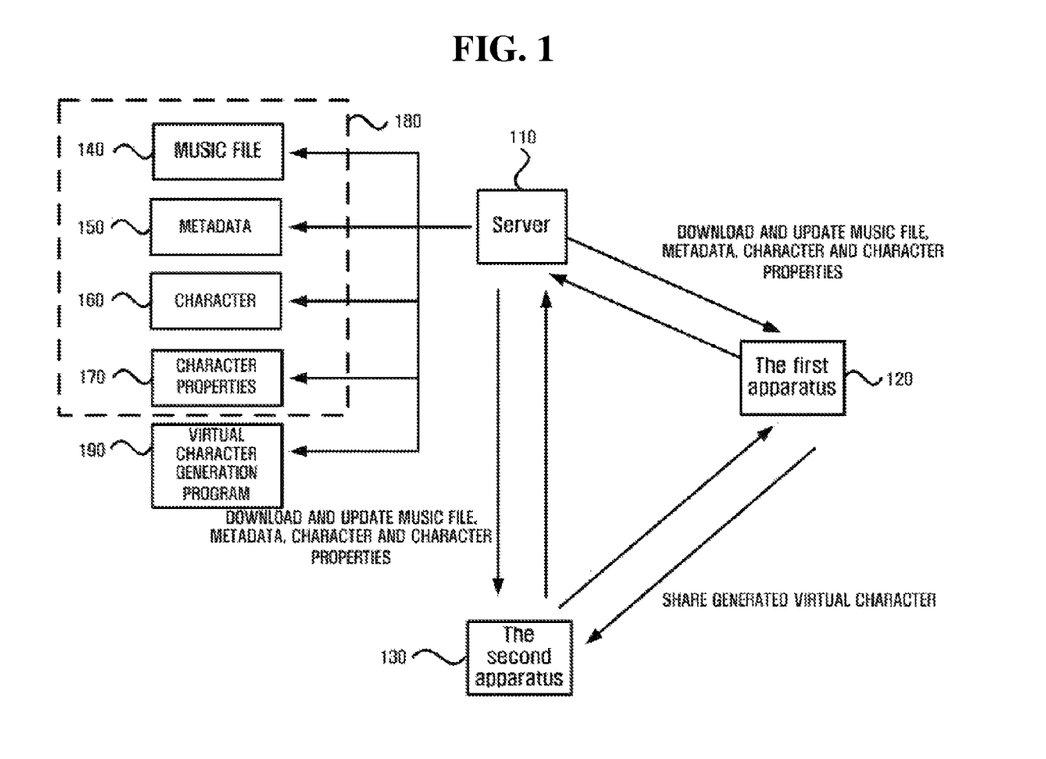
FIG. 1 illustrates a system for synchronizing and sharing a virtual character according to an exemplary embodiment of the present invention.

FIG. 1 illustrates a system for synchronizing and sharing a virtual character according to an exemplary embodiment of the present invention.

Referring to FIG. 1, the system includes a server 110, a first apparatus 120, and a second apparatus 130.

The server 110 stores content 180, such as a music file 140, metadata 150 corresponding to the music file 140, a character 160 and character properties 170, and a virtual character generation program 190 for generating a virtual character synchronizing the content 180. At the request of the first apparatus 120, the server 110 transmits the content 180 or the virtual character generation program 190 to the first apparatus 120. In addition, the server 110 is synchronized with the first apparatus 120 in order to automatically update and transmit the content 180 and the virtual character generation program 190.

The music file 140 stores music, such as Korean songs and pop songs. The format of the music file 140 includes MPEG audio layer-3 (MP3) and advanced audio coding (AAC). The music file 140 can be reproduced by a commonly used media player.

Figure 3:
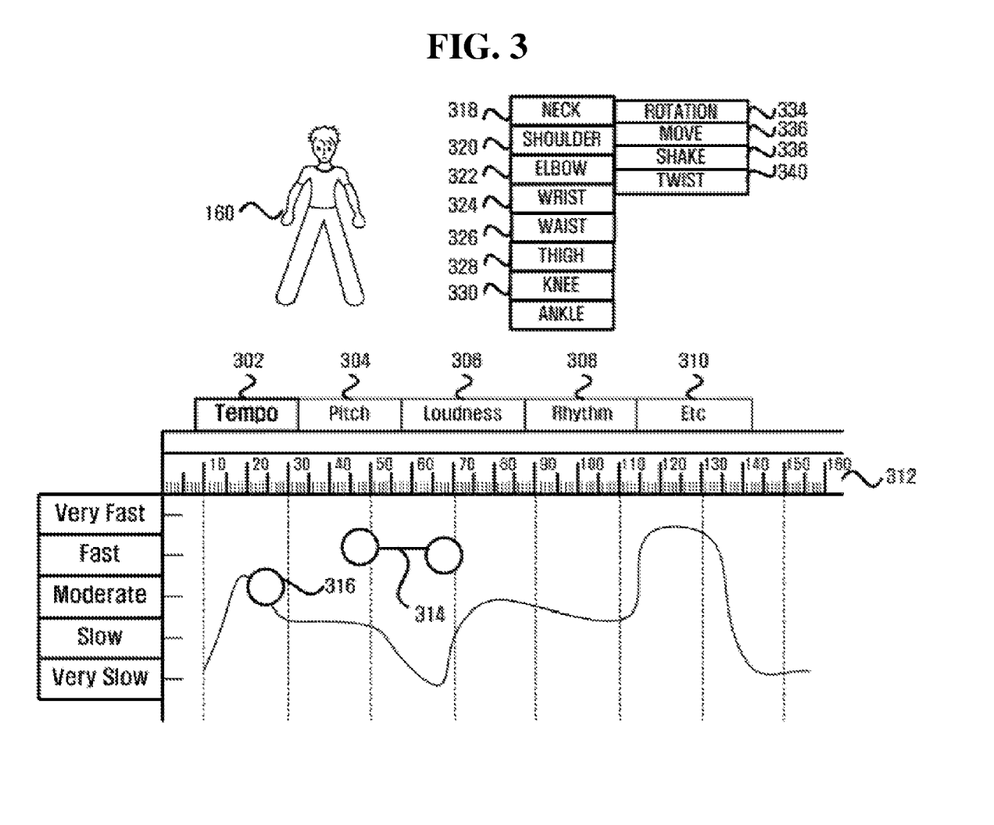
FIG. 3 illustrates a user interface for generating a virtual character according to an exemplary embodiment of the present invention.

FIG. 3 illustrates a user interface for generating a virtual character according to an exemplary embodiment of the present invention.

Referring to FIGS. 1 and 3, the metadata 150 corresponding to the music file 140 includes tempo 302, pitch 304, loudness 306, and rhythm 308. The level of tempo 302 is divided into "very slow, slow, moderate (quickly), moderate, fast (quickly), and very fast." The level of pitch 304 is divided into "very low, low, intermediate, high and very high." The level of loudness 306 is divided into "very weak, weak, intermediate, strong and very strong." Tempo 302, pitch 304, loudness 306 and rhythm 308 are mere examples of the metadata 150, and the types of the metadata 150 may be increased or reduced according to a user's setting. In addition, the level of each of tempo 302, pitch 304, loudness 306, and rhythm 308 included in the metadata 150 is a mere example and can be adjusted according to the user's setting.

The server 110 and the first apparatus 120 extract the metadata 150 which is stored together with the music file 140.

The character 160 is a file storing images and moving images, and the format of the file includes avi and mpeg. In addition, the character 160 can be reproduced by a commonly used media player.

Referring to FIG. 3, predetermined body parts of the character 160 include neck 318, shoulder 320, elbow 322, wrist 324, waist 326, thigh 328, knee 330 and ankle 332. Each predetermined body part of the character 160 may be synchronized with the character properties 170 or a predetermined motion. In the present exemplary embodiment, the predetermined body parts of the character 160 are eight body parts. However, the exemplary embodiment of the present invention is not limited thereto, and the predetermined body parts can be increased or reduced according to the user's setting. Each predetermined body part and each predetermined motion will be described in detail with reference to FIG. 3.

The character properties 170 include clothes of the character 160, background screens, and styles of the character 160.

The virtual character generation program 190 performs the following functions.

First, the virtual character generation program 190 synchronizes and sets the metadata 150 corresponding to the music file 140 and a body part of the character 160, which will be described in detail later with reference to FIG. 3.

Second, the virtual character generation program 190 synchronizes and sets the character 160 and predetermined motions of the character 160. Although the synchronizing and setting method will be described later with reference to FIGS. 3 and 5, the predetermined motions of the character 160 include rotate 334, move 336, shake 338, and twist 340. The virtual character generation program 190 synchronizes and sets each body part of the character 160 and each predetermined motion. In the present exemplary embodiment, there are four predetermined motions of the character 160. However, the predetermined motions may be increased or reduced according to the user's setting. The synchronizing and setting method will be described in detail later with reference to FIG. 3.

Third, the virtual character generation program 190 synchronizes a body part of the character 160, a predetermined motion, and the metadata 150 corresponding to the music file 140, which will be described in detail later with reference to FIG. 3.

Therefore, the user can generate a virtual character by setting and synchronizing the body part of the character 160, the predetermined motion, and the metadata 150 corresponding to the music file 140.

Figure 2:
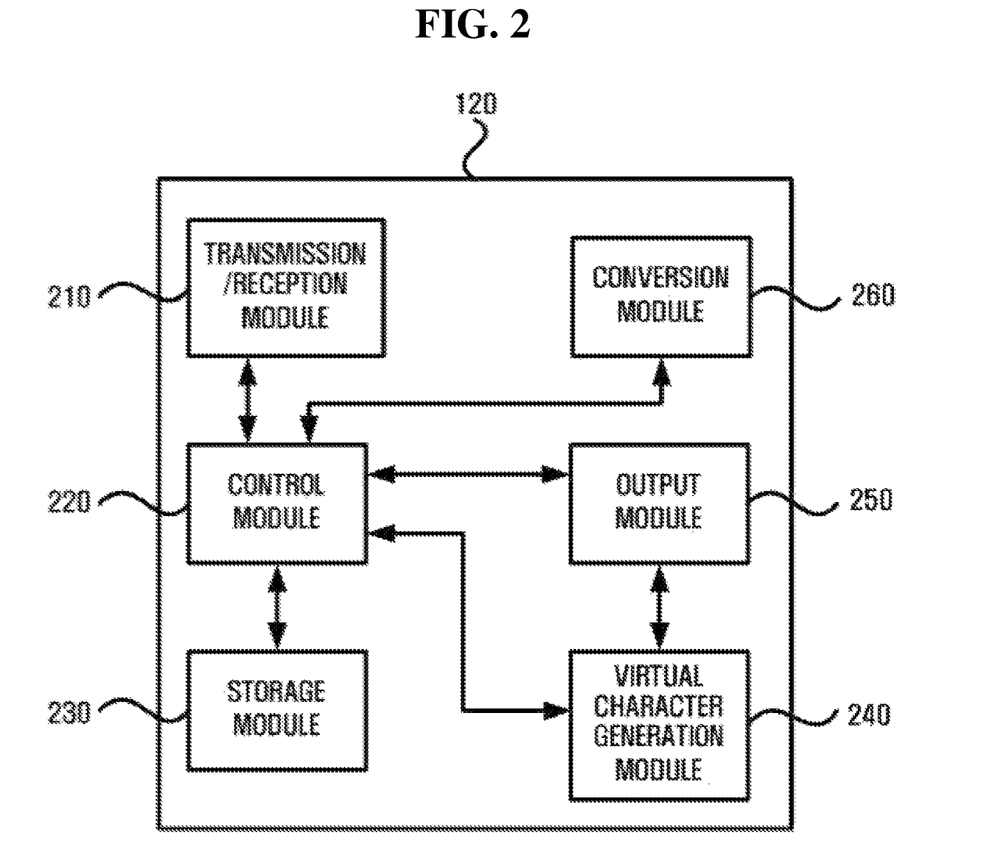
FIG. 2 is a block diagram of an apparatus for synchronizing and sharing a virtual character according to an exemplary embodiment of the present invention.

FIG. 2 is a block diagram of an apparatus 120 for synchronizing and sharing a virtual character according to an exemplary embodiment of the present invention.

Referring to FIGS. 1 and 2, the first apparatus 120 performs the following functions. First, the first apparatus 120 downloads the content 180 or the virtual character generation program 190 from the server 110 and installs the downloaded content 180 or the downloaded virtual character generation program 190. The virtual character generation program 190 installed in the first apparatus 120 denotes a virtual character generation module 240. The virtual character generation program 190 may be directly installed in the first apparatus 120.

Second, the first apparatus 120 transmits a virtual character generated using the virtual character generation module 240 to another apparatus. Specific elements and an execution method of the first apparatus 120 will be described later with reference to FIG. 2.

The first apparatus 120 may be embedded in a personal digital assistant (PDA), a cellular phone, a personal communication service (PCS) phone, a hand-held personal computer (PC), a global system for mobile (GSM) phone, a wideband code division multiple access (CDMA) phone, a CDMA-2000 phone, and a mobile broadband system (MBS) phone.

Referring to FIG. 2, the first apparatus 120 includes a transmission and reception module 210, a control module 220, a storage module 230, the virtual character generation module 240, an output module 250, and a conversion module 260.

The transmission and reception module 210 downloads the content 180, such as the music file 140, the metadata 150, the character 160 and the character properties 170, and the virtual character generation program 190 from the server 110 through wireless or wired Internet and stores them in the storage module 230. In addition, the transmission and reception module 210 transmits a virtual character generated by a user using the virtual character generation module 240 or an extensible markup language (XML)-based virtual character to another apparatus 130.

The storage module 230 stores the content 180 and the virtual character generation program 190. In addition, the storage module 230 stores a virtual character generated using the virtual character generation module 240 or an XML-based file into which the virtual character has been converted.

The virtual character generation module 240 combines the content 180, that is, the music file 140, the metadata 150, the character 160 and the character properties 170, received from the storage module 230. Here, combining includes integration or synchronization. A method of combining the content 180 will be described later with reference to FIG. 3.

The output module 250 displays the content 180, which is stored in the storage module 230, on a screen thereof. If a user selects a body part of the character 160, a screen for selecting one of predetermined motions is displayed. If the user selects any one of the predetermined motions, the control module 220 transmits a signal to the virtual character generation module 240 to synchronize the body part of the character 160 with the selected motion.

In addition, if the user selects any one of the metadata 150 corresponding to the music file 140, the selected metadata 150 is displayed. Then, the control module 220 transmits a signal to the virtual character generation module 240 to synchronize the selected metadata 150 with a body part of the character 160. The above process will be described in detail later with reference to FIG. 3.

After a virtual character is completed, the conversion module 260 converts the virtual character into an XML-based file and stores the XML-based file, which will be described later with reference to FIGS. 4 and 5.

The control module 220 manages and controls the transmission and reception module 210, the storage module 230, the virtual character generation module 240, the output module 250 and the conversion module 260. In addition, as described above, the control module 220 transmits a signal to the virtual character generation module 240 to synchronize a motion, the metadata 150 and a body part of the character 160, which are selected by the user.

FIG. 3 illustrates a user interface for generating a virtual character according to an exemplary embodiment of the present invention.

Referring to FIG. 3, the output module 250 displays the character 160 and the metadata 150 corresponding to the music file 140. The predetermined body parts of the character 160 include neck 318, shoulder 320, elbow 322, wrist 324, waist 326, thigh 328, knee 330 and ankle 332. In the present exemplary embodiment, the predetermined body parts of the character 160 are eight body parts. However, the exemplary embodiment of the present invention is not limited thereto, and the predetermined body parts can be increased or reduced.

The character properties 170 as illustrated in FIG. 1 (not shown in FIG. 3), include background screens and clothes.

The metadata 150 corresponding to the music file 140 includes tempo 302, pitch 304, loudness 306, rhythm 308 and other types of metadata 310. In the present exemplary embodiment, the metadata 150 includes four types of metadata. However, the exemplary embodiment of the present invention is not limited thereto, and the metadata 150 can be increased or reduced.

The levels of tempo 302 in the metadata 150 are displayed as "very slow, slow, moderate (quickly), moderate, fast (quickly), and very fast" on a vertical axis of the user interface. The levels of pitch 304 are displayed as "very low, low, intermediate, high, and very high" on the vertical axis. The levels of loudness 306 are displayed as "very weak, weak, intermediate, strong, and very strong" on the vertical axis. The levels of rhythm 308 are displayed as "very low, low, intermediate, high, and very high" on the vertical axis. In the present exemplary embodiment, the levels of each of the tempo 302, the pitch 304, the loudness 306, the rhythm 308, and other features 310 included in the metadata 150 are set on the vertical axis. However, the exemplary embodiment of the present invention is not limited thereto, and they may also be set on a horizontal axis of the user interface.

A reproduction time of the music file 140 is divided into predetermined time slots and, thus, a time region 312 is set. Each of the predetermined time slots is defined as a second. For example, if the reproduction time of the music file 140 is one minute, the time region 312 includes 60 time slots. A user may arbitrarily set the time slots. Although the time region 312 is set on the horizontal axis, the exemplary embodiment of the present invention is not limited thereto. The time region 312 may be set on the vertical axis.

If the user selects any one of the metadata 150, that is, any one of tempo 302, pitch 304, loudness 306, rhythm 308 and other features 310, the time region 312 of the music file 140 is displayed on the horizontal axis of the user interface, and the levels of the selected metadata 150 are displayed on the vertical axis. That is, if the user selects tempo 302, "very slow, slow, moderate (quickly), moderate, fast (quickly), and very fast" are displayed on the vertical axis. The same applies when the user selects pitch 304, loudness 306, rhythm 308, or the like.

Therefore, the time region 312 of the music file 140 is displayed on the horizontal axis, and the levels of the selected metadata 150 are displayed on the vertical axis. Accordingly, a graph showing the correlation between the time region 312 and the metadata 150 of the music file 140 is displayed.

After the user selects any one of the metadata 150, the user may select a point, e.g., point 316, or a time slot, e.g., time slot 214, that is, two points, in the time region 312 on the horizontal axis.

After the user selects a point in the time region 312, the user selects one or more of the predetermined body parts of the character 160 and synchronizes the selected body part (or parts) of the character 160 with the music file 140.

After the user selects a time slot in the time region 312, the user selects one or more of the predetermined body parts of the character 160 and synchronizes the selected body part with the music file 140. Accordingly, the selected body part of the character 160 is synchronized with the music file 140.

In a state where the selected body part of the character 160 is synchronized with the music file 140, the selected body part may be synchronized with a motion. If the user selects any one of the predetermined parts of the body of the character 160, a menu corresponding to the selected body part, such as neck 318, shoulder 320, elbow 322, wrist 324, waist 326, thigh 328, knee 330 or ankle 332, is popped up and displayed.

If the user selects neck 318, the user can select one of the predetermined motions of neck 318 of the character 160, that is, rotate 334, move 336, shake 338, and twist 380. Although not shown in FIG. 3, rotate 334 includes 90-degree rotation and 180-degree rotation. Similarly, move 336, shake 338 and twist 340 can be set variously.

Even when the user selects another body part of the character 160, the selected body part can be synchronized with a motion as described above.

Using the method described above, the user may set and synchronize the metadata 150, that is, tempo 302, pitch 304, loudness 306 and rhythm 308, a body part of the character 160 and a motion of the body part according to each time slot of the time region 312 and generate a virtual character.

Figure 4:
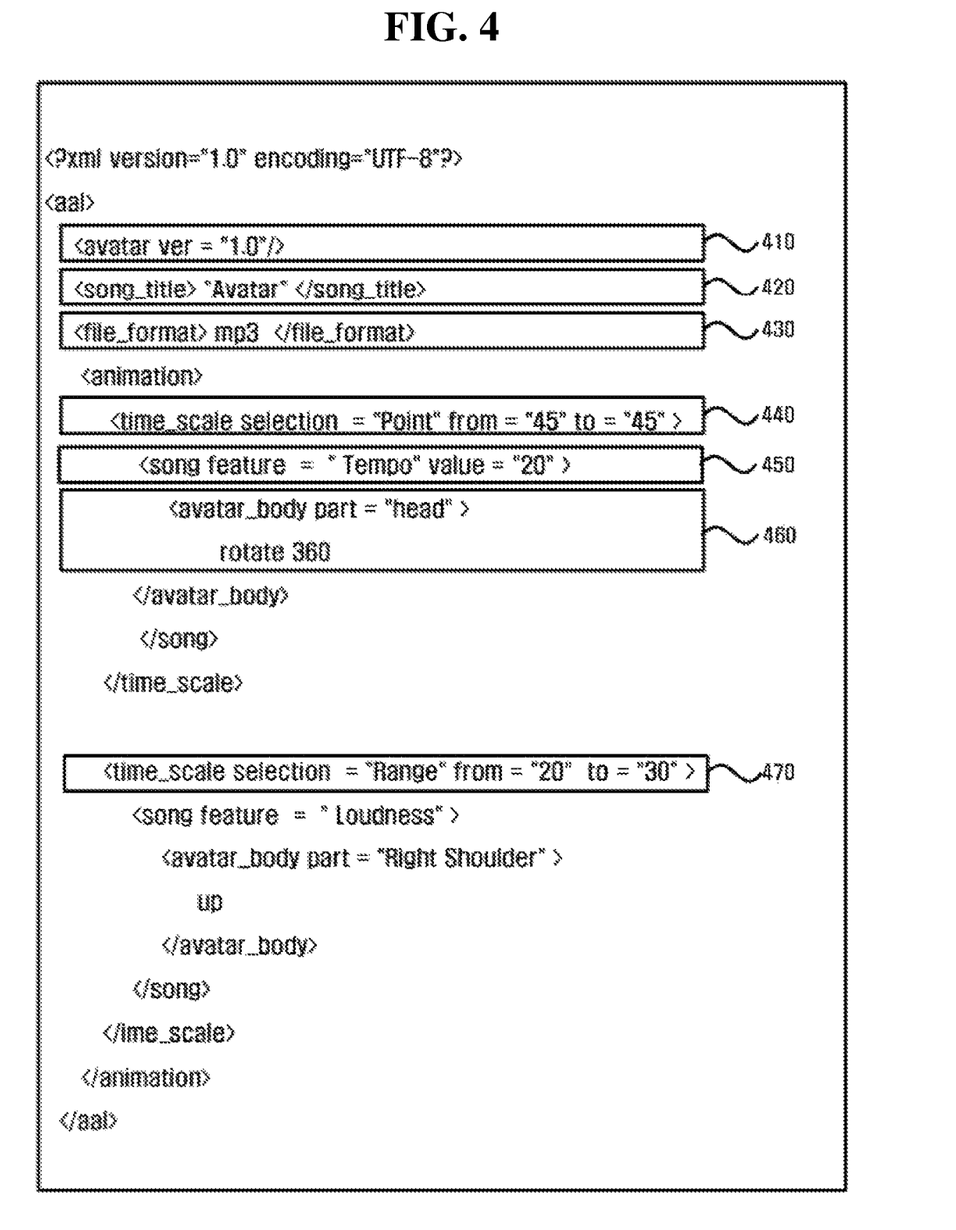
FIG. 4 illustrates a program for generating a virtual character according to an exemplary embodiment of the present invention.

FIG. 4 illustrates a program for generating a virtual character according to an exemplary embodiment of the present invention.

Referring to FIG. 4, a version 410 of the character 160, a title 420 of the music file 140, and a format 430 of the music file 140 are designated, and a code for synchronizing the character 160 with the metadata 150 of the music file 140 is briefly illustrated. Specifically, a code, which enables a user to select (operation 440) a point in the time region 312, designate (operation 450) a level of tempo 302 of the metadata 150, and select a body part of the character 160 and rotate the selected body part 360 degrees (operation 460), is illustrated. Also, a code for setting (operation 470) a time slot in the time region 312 is illustrated. Therefore, the user generates a virtual character by synchronizing a body part of the character 160, a motion, and the music file 140.

Figure 5:
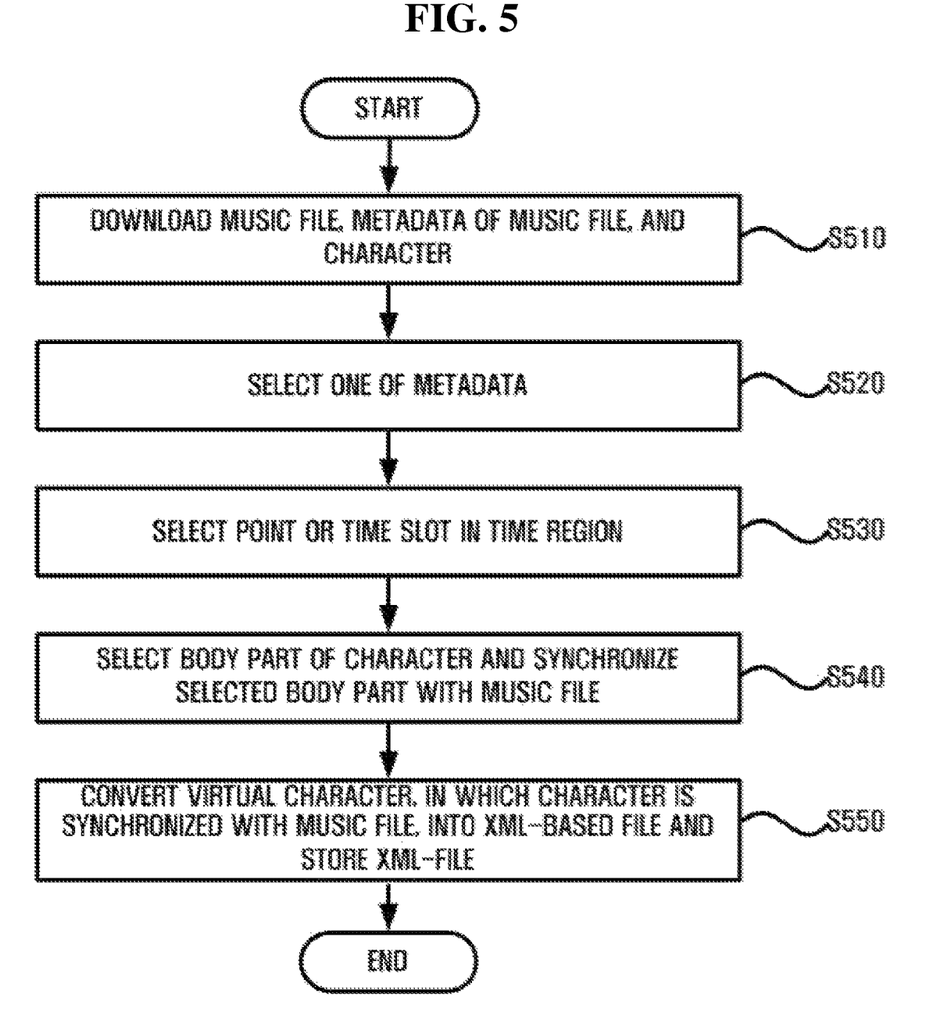
FIG. 5 is a flowchart illustrating a method of synchronizing a music file with a character and generating a virtual character according to an exemplary embodiment of the present invention.

FIG. 5 is a flowchart illustrating a method of synchronizing a music file with a character and generating a virtual character according to an exemplary embodiment of the present invention.

Referring to FIG. 5, the virtual character generation module 240 downloads the music file 140, the metadata 150 corresponding to the music file 140, and the character 160 from the storage module 230 (operation S510). The metadata 150 includes tempo 302, pitch 304, loudness 306, and rhythm 308.

When a user selects any one of the metadata 150 (operation S520), the time region 312 is displayed on the horizontal axis of the screen of the output module 250, and the levels of the selected metadata 150 are displayed as "very slow, slow, moderate (quickly), moderate, fast (quickly), and very fast" on the vertical axis.

The user selects a point or a time slot in the time region 312 displayed on the screen (operation S530). Then, the selected point or time slot is displayed on the screen as illustrated in FIG. 3.

The user selects any one of predetermined body parts of the character 160 displayed on the screen of the output module 250 and synchronizes the selected body part with the music file 140 (operation S540). The predetermined body parts of the character 160 include neck 318, shoulder 320, elbow 322, wrist 324, waist 326, thigh 328, knee 330 and ankle 332.

The selected body part of the character 160 is synchronized with the point or time slot of the time region 312 of the music file 140, which was selected in operation S530. Consequently, a virtual character is generated. In addition, the selected body part of the character 160 is synchronized with a motion. Therefore, a virtual character producing music as it moves is generated.

After the virtual character is generated, the virtual character, in which the character 160 is synchronized with the music file 140, is converted into an XML-based file and stored accordingly (operation S550).

As described above with reference to FIG. 3, the conversion module 260 converts the virtual character into an XML-based file and stores the XML-based file in order to easily share the virtual character with another apparatus 130 and enable the other apparatus to generate a new virtual character. The stored XML-based file can be transmitted to the other apparatus through the transmission and reception module 210.

As described above, an apparatus and method for synchronizing and sharing a virtual character according to the exemplary embodiment of the present invention enable a user to synchronize a body part of a virtual character with a music file. Therefore, the user can generate a virtual character which can express rich feeling and personality of music.

Since the user can also adjust extracted metadata corresponding to the music file with the body part of the character, the user can provide a user interface of a user created content (UCC) type.

In addition, the user can convert a virtual character into an XML-based file and store and share the XML-based file. Therefore, the virtual character can be shared with another user, and the other user can generate a new character using the shared virtual character.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. An apparatus for synchronizing and sharing a virtual character, the apparatus comprising:
   a transmission and reception module which receives content; and
   a virtual character generation module which synchronizes the content and generates a virtual character,
   wherein the virtual character is generated by synchronizing individual body parts of the virtual character, predetermined motion, and metadata corresponding to a music file,
   wherein the body parts comprise at least one of a neck, a shoulder, an elbow, a wrist, a waist, a thigh, a knee and an ankle,
   wherein each of the individual body parts is selected by a user and synchronized with the music file, and
   wherein when the user selects at least one of the metadata, a time region is displayed on a horizontal axis of a screen of the apparatus, and levels of the selected metadata are displayed on a vertical axis of the screen.

2. The apparatus of claim 1, further comprising a conversion module which converts the virtual character into an extensible markup language (XML)-based file.

3. The apparatus of claim 1, wherein the content comprises at least one of a first character, character properties, a music file, and metadata which corresponds to the music file.

4. The apparatus of claim 3, wherein the virtual character generation module synchronizes the first character with the metadata corresponding to the music file, to generate the virtual character.

5. The apparatus of claim 3, further comprising an output module which displays predetermined body parts of the first character.

6. The apparatus of claim 5, wherein the output module displays at least one of a divided time region of the music file and the metadata.

7. The apparatus of claim 6, wherein the metadata comprises at least one of a tempo, a pitch, a loudness and a rhythm.

8. The apparatus of claim 6, further comprising a control module, which if a point or a time slot in the displayed divided time region and one of the displayed metadata are selected, transmits the selected point or time slot and the selected metadata to the virtual character generation module.

9. The apparatus of claim 8, wherein, if one of the displayed predetermined body parts is selected and a motion corresponding to the selected predetermined body part is selected, the control module transmits the selected predetermined body part and the selected motion to the virtual character generation module.

10. The apparatus of claim 9, wherein the virtual character generation module synchronizes the selected predetermined body part, the selected point or time slot in the time region of the music file and the selected metadata.

11. The apparatus of claim 9, wherein the virtual character generation module synchronizes the selected predetermined body part with the selected motion.

12. The apparatus of claim 5, wherein the output module displays predetermined motions which correspond to the predetermined body parts of the displayed first character.

13. The apparatus of claim 12, wherein the predetermined motions comprise at least one of a rotation, a movement, a shaking and a twisting.

14. A method, by an apparatus, of synchronizing and sharing a virtual character, the method comprising:
   synchronizing, by the apparatus, content in a predetermined form and generating a virtual character;
   converting the generated virtual character into an XML-based file and storing the XML-based file,
   generating the virtual character by synchronizing individual body parts of the virtual character, predetermined motion, and metadata corresponding to a music file, and when the user selects at least one of the metadata, displaying a time region on a horizontal axis of a screen of the apparatus, and displaying levels of the selected metadata on a vertical axis of the screen, wherein the body parts comprise at least one of a neck, a shoulder, an elbow, a wrist, a waist, a thigh, a knee and an ankle, and wherein each of the individual body parts is selected by a user and synchronized with the music file.

15. The method of claim 14, wherein the content comprises at least one of a first character, character properties, a music file, and metadata corresponding to the music file.

16. The method of claim 15, wherein the synchronizing of the content comprises synchronizing the first character, a point or a time slot in a divided time region of the music file, and the metadata.

17. The method of claim 16, further comprising displaying the first character, the divided time region of the music file, and the metadata.

18. The method of claim 17, further comprising, if predetermined body parts of the first character are selected, displaying predetermined motions corresponding to the predetermined body parts of the first character.

19. The method of claim 18, further comprising selecting at least one of the displayed first character, a point or time slot in the displayed time region of the music file, the displayed metadata, and the predetermined motions.

20. The method of claim 19, further comprising synchronizing the selected first character, the selected point or the selected time slot in the time region and the selected metadata.

21. The method of claim 18, wherein the predetermined motions comprise at least one of a rotation, a movement, a shaking and a twisting.

22. The method of claim 17, wherein the metadata comprises at least one of a tempo, a pitch, a loudness and a rhythm.

23. The method of claim 14, further comprising transmitting the virtual character to another apparatus and sharing the virtual character with the another apparatus.

* * * * *